A. KLOTZ.
Windmill-Wheel.
No. 200,066. Patented Feb. 5, 1878.
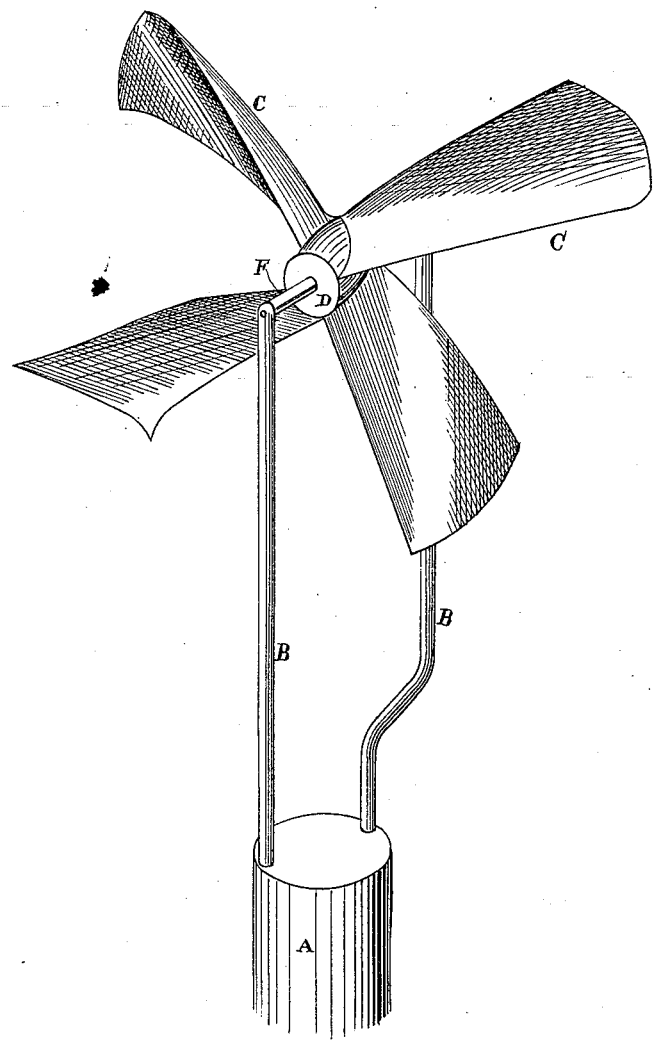
Witnesses
Jno. L. Bone
Frank A. Brooks
Inventor
August Klotz
by Dewey & Co.
Attys

UNITED STATES PATENT OFFICE.

AUGUST KLOTZ, OF VALLEJO, CALIFORNIA.

IMPROVEMENT IN WINDMILL-WHEELS.

Specification forming part of Letters Patent No. 200,066, dated February 5, 1878; application filed October 22, 1877.

*To all whom it may concern:*

Be it known that I, AUGUST KLOTZ, of Vallejo, county of Solano, and State of California, have invented an Improved Windmill-Wheel; and I do hereby declare the following to be a full, clear, and exact description thereof, reference being had to the accompanying drawings.

My invention relates to certain improvements in the construction of vertical windmills.

It consists in forming each fan or blade of the wind-wheel of thin sheet metal, and in bending these blades to the required form to catch the wind.

The wind-wheel I secure between two fixed uprights, so that it will maintain a fixed position with reference to the direction of the wind. The flexibility of these thin sheet-metal blades will then regulate the speed of the wheel, because, as the force of the wind increases, the flexible blades will be twisted to a position more nearly in line with the wind. As the force of the wind decreases, the blades will resume their normal position, thus accommodating themselves to the varying force of the wind, and preserving a uniform rate of speed.

Referring to the accompanying drawings, A represents the upper end of the post or upright upon which the wheel is mounted. B B are two small uprights, which extend upward from the upper end of the post A, their upper ends being spread sufficiently far apart to admit the wheel between them.

The wheel consists of a number of radiating blades, C C C C, cast in or otherwise firmly secured to a hub, D.

Each blade is made of a piece of thin sheet metal, curved spirally, and the bases of the blades are attached spirally to the hub.

The hub is fixed upon a spindle, F, and this spindle has a gudgeon at each end, which is supported in a bearing in the upper ends of the uprights B B.

In localities where the wind has a prevailing direction, the wheel and its supporting-upright can be permanently fixed in position to conform thereto; but where the wind is variable, the post upon which the wheel is mounted must be arranged so that the wheel can be faced round to meet it, and then fixed in that position.

The outer end of each blade is slightly bent outward, to give strength to the blade and confine the wind.

The blades should be cast solid upon the hub, or otherwise secured with great firmness.

This windmill is intended for driving pumps, and for all other purposes for which such a power is applicable.

It can be made of any size by the addition of strengthening-rods from the extremity of the blades, so arranged as not to interfere with their flexibility.

These wings or blades, being made of metal and being elastic, are better able to resist sudden gusts of wind. The blades or fans will receive the full force of the wind, thereby utilizing its maximum power.

These flexible blades will also partly act as self-regulators without bending, because they have such a curved shape in the direction of the wheel-axis that before a fierce gale they tend to present a feather-edge and let the most of it pass by and when running at a high rate of speed there will be a tendency to a reactionary force upon the first half of their convex back.

The impinging area is increased by slower speed of the wheel relatively to the wind, because the direction of the wind to the wheel in motion is then less inclined to the axis.

If the wheel is mounted upon a turn-table, a tail or rudder can be employed for turning it into or out of the wind for regulating, and the blades would not need to be so very flexible for this purpose. For safety, however, it should twist somewhat to let some of the sudden gusts escape.

Having thus described my invention, what I claim, and desire to secure by Letters Patent, is—

1. A vertical wind-wheel having its blades curved with a gradually-increasing inclination in the direction of the axis of the wheel, said blades being twisted spirally and made of flexible material, substantially as and for the purpose described.

2. A windmill composed of the hub D, with its radiating spirally-twisted metallic blades C C C upon a shaft or spindle, F, between fixed uprights B B, substantially as and for the purpose set forth.

In witness whereof I have hereunto set my hand.

CARL AUGUST KLOTZ.

Witnesses:
A. L. HATHEWAY,
B. DEGERICK.